UNITED STATES PATENT OFFICE.

MAXIMILIAN MATTHEUS HAFF, OF OTTAWA, ONTARIO, CANADA, ASSIGNOR TO THOMAS LEOPOLD WILLSON, OF OTTAWA, CANADA.

PROCESS FOR SEPARATING PHOSPHORIC ACID FROM NATURAL PHOSPHATES.

1,076,497.  
Specification of Letters Patent.  
Patented Oct. 21, 1913.

No Drawing.  Application filed April 4, 1912.  Serial No. 688,544.

*To all whom it may concern:*

Be it known that I, MAXIMILIAN MATTHEUS HAFF, a subject of the King of Great Britain, residing at the city of Ottawa, in the Province of Ontario, Canada, have invented certain new and useful Improvements in Processes for Separating Phosphoric Acid from Natural Phosphates, of which the following is a specification.

This invention relates to an improved process for separating phosphoric acid and the objects are to produce phosphoric acid by a process which will involve the handling of a minimum amount of material and may be carried out at sufficiently low cost to be commercially practicable.

The invention comprises subjecting pulverized natural phosphates with clay to electric heat, and recovering the phosphoric acid as hereinafter set forth and described.

In practising the invention any well known natural phosphate, such as calcium phosphate or aluminum phosphate is pulverized and mixed with clay and brought to a molten state in a suitable electric furnace, preferably of the arc resistance type, and maintained in such molten state by the action of the electric arc upon it, the temperature of the arc usually being considered to be around 3000° centigrade.

The clay used may be ordinary blue clay, and the proportion of it preferably as follows: 60 parts clay, 100 parts phosphate. These proportions apply where the clay contains from sixty to seventy per cent. of silica, fifteen to thirty-five per cent. of alumina and naught to eight per cent. of iron oxid, and the phosphate contains eighty-five per cent. of $Ca_3(PO_4)_2$. With other clays the proportions will be varied to correspond.

The slag is tapped out as it accumulates and the volatile phosphoric acid is caught in any suitable way, such as by a water spray, or by moistened calcareous material such as raw crushed phosphate rock or lime. If desired the phosphoric acid can be readily extracted from the vapors as a salt, by bringing ammonia, potash or soda into contact with these vapors and thereby fixing the phosphoric acid in commercial form. As an alternative, the vaporous acid might be first caught in water and then fixed by adding this solution to calcareous material or to the ammonia, soda or potash.

It may be noted that no reducing action whatever is depended upon, and it is preferable to prevent as far as possible the introduction of any substance which will have a reducing action on the phosphoric acid.

It may be stated that the present process is not intended to include within its range the use of feldspar or similar feldspathic aluminum silicate. The term "clay" is used herein to indicate compounds, such as earth or soil, which generally pass under this name and are somewhat of the nature of aluminous silicates.

What I claim as my invention is:

1. The herein described process of obtaining phosphoric acid which comprises subjecting natural phosphate with a non-feldspathic aluminum silicate to the heat of the electric arc under such conditions as to volatilize phosphoric acid, and recovering the volatilized phosphoric acid.

2. The herein described process of obtaining phosphoric acid, which comprises subjecting natural phosphate with a non-feldspathic aluminum silicate to the heat of the electric arc under such conditions as to volatilize phosphoric acid, and fixing the phosphoric acid with raw phosphate material.

3. The herein described process of obtaining phosphoric acid, which comprises subjecting sixty parts of a non-feldspathic aluminum silicate and one hundred parts of natural phosphate to the heat of the electric arc under such conditions as to volatilize phosphoric acid, and recovering the volatile phosphoric acid.

In witness whereof I have hereunto set my hand in the presence of two witnesses.

MAXIMILIAN MATTHEUS HAFF.

Witnesses:
RUSSEL S. SMART,
PEARLE M. GARROW.